US010374757B2

United States Patent
Koskinen

(10) Patent No.: US 10,374,757 B2
(45) Date of Patent: Aug. 6, 2019

(54) IMPROVING COMMUNICATION EFFICIENCY

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 44 days.

(21) Appl. No.: 15/523,917

(22) PCT Filed: Nov. 6, 2014

(86) PCT No.: PCT/EP2014/073857
§ 371 (c)(1),
(2) Date: May 2, 2017

(87) PCT Pub. No.: WO2016/070919
PCT Pub. Date: May 12, 2016

(65) Prior Publication Data
US 2017/0346603 A1    Nov. 30, 2017

(51) Int. Cl.
*H04L 1/18* (2006.01)

(52) U.S. Cl.
CPC .......... *H04L 1/1858* (2013.01); *H04L 1/1864* (2013.01); *H04L 1/1896* (2013.01)

(58) Field of Classification Search
CPC ... H04L 1/1858; H04L 1/1856; H04L 1/1864; H04L 1/1896; H04W 36/08; H04W 36/0027; H04W 36/0061
See application file for complete search history.

(56) References Cited

U.S. PATENT DOCUMENTS

2015/0358866 A1* 12/2015 Xu .................. H04W 36/00
370/331

FOREIGN PATENT DOCUMENTS

| EP | 1942649 A1 | 7/2008 |
| WO | 0021231 A2 | 4/2000 |
| WO | 2008096908 A1 | 8/2008 |
| WO | 2012026854 A1 | 3/2012 |

OTHER PUBLICATIONS

Zhang et al., LTE small cell enhancement by dual connectivity, wireless world, version 1.1, white paper, pp. 1 to 22 (retrieved from google.com) (Year: 2014).*
Jha et al., Dual connectivity in LTE small cell networks, IEEE, pp. 1205-1210. (Year: 2014).*

(Continued)

*Primary Examiner* — Shelly A Chase
(74) *Attorney, Agent, or Firm* — Brake Hughes Bellermann LLP

(57) ABSTRACT

There is provided a method comprising: receiving, by a first network node, data packets transmitted by a second network node; if at least one data packet of the data packets is noticed not being available to the first network node, sending an indication to the second network node that the at least one data packet of the data packets is not available to the first network node, and repeating sending the indication until a confirmation message is received, wherein the confirmation message comprises confirmation that the indication is received by the second network node.

20 Claims, 6 Drawing Sheets

(56) References Cited

OTHER PUBLICATIONS

Mukherjee, Macro-small cell grouping in dual connectivity LTE-B networks with non-ideal backhaul, IEEE, pp. 2520-2525. (Year: 2014).*

International Search Report and Written Opinion received for corresponding Patent Cooperation Treaty Application No. PCT/EP2014/073857, dated Apr. 29, 2015, 11 pages.

\* cited by examiner

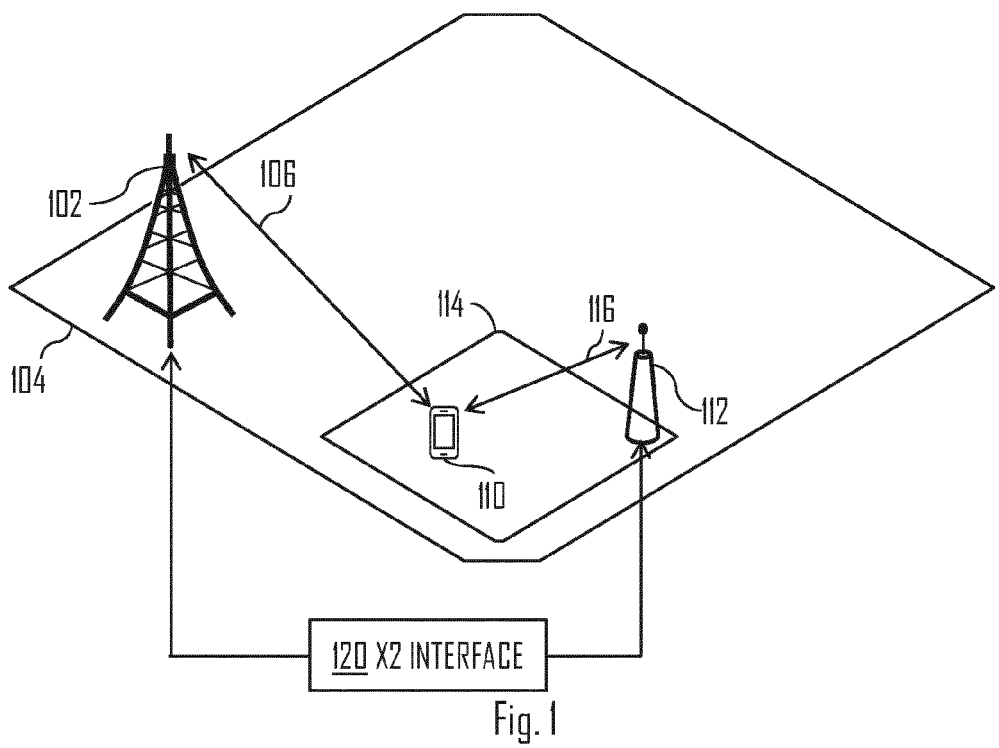

Fig. 1

210 RECEIVING, BY A FIRST NETWORK NODE, DATA PACKETS TRANSMITTED BY A SECOND NETWORK NODE

220 IF AT LEAST ONE DATA PACKET OF THE DATA PACKETS IS NOTICED NOT BEING AVAILABLE TO THE FIRST NETWORK NODE, SENDING AN INDICATION TO THE SECOND NETWORK NODE THAT THE AT LEAST ONE DATA PACKET OF THE DATA PACKETS IS NOT AVAILABLE TO THE FIRST NETWORK NODE

230 REPEATING SENDING THE INDICATION UNTIL A CONFIRMATION MESSAGE IS RECEIVED, WHEREIN THE CONFIRMATION MESSAGE COMPRISES CONFIRMATION THAT THE INDICATION IS RECEIVED BY THE SECOND NETWORK NODE

IMPROVING COMMUNICATION EFFICIENCY

RELATED APPLICATION

This application was originally filed as Patent Cooperation Treaty Application No. PCT/EP2014/073857 filed Nov. 6, 2014

TECHNICAL FIELD

The invention relates to communications.

BACKGROUND

In a communication network data may be transmitted by and received from multiple sources. Providing solutions to improve the reliability and effectiveness of the multisource data transmission may be beneficial for the overall performance of the communication network.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates an example a radio system to which embodiments of the invention may be applied;

FIGS. 2 and 3 illustrate flow diagrams of some embodiments of the invention;

DETAILED DESCRIPTION OF SOME EMBODIMENTS

Figure 3:
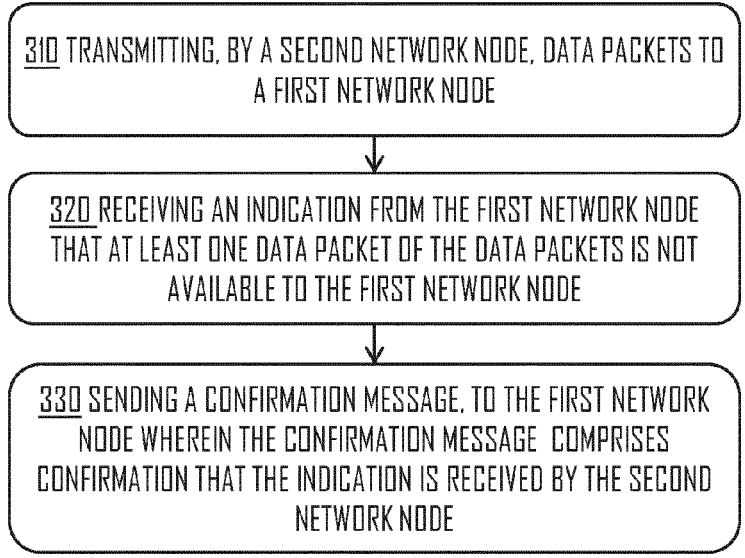

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

FIG. 1 shows an example of a radio system to which embodiments of the invention may be applied. Radio communication networks, such as the Long Term Evolution (LTE) or the LTE-Advanced (LTE-A) of the $3^{rd}$ Generation Partnership Project (3GPP), are typically composed of at least one network element, such as a network element 102, providing a cell 104. Each cell may be, e.g., a macro cell, a micro cell, or a pico-cell, for example. Thus, the communication network may be a heterogeneous network (HetNet). The network element 102 may be a network node, an evolved node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. The network element 102 may be a base station or a small base station, for example. In the case of multiple eNBs in the communication network, the eNBs may be connected to each other with an X2 interface 120 as specified in the LTE. Other communication methods between the network elements may be possible.

The network element 102 may control a cellular radio communication link 106 established between the network element 102 and at least one terminal device 110 located within or comprised in the cell 104. The communication link 106 may be referred to as conventional communication link for end-to-end communication, where the source device transmits data to the destination device via the network element 102 and/or core network. The network may support time division duplex (TDD) mode of operation.

The radio system may comprise a second network element 112. The second network element 112 may be similar to the network element 102. For example, the second network element 112 may be a small network element 112, such a small base station, used to increase the communication network's performance in certain areas. Thus, a cell 114 may be, e.g., a macro cell, a micro cell, or a pico-cell, for example.

The small cell 114 provided by the small network element 112 may at least partly be within and/or comprised in the cell 104. The small cell 114 may be within multiple cells provided by network element(s). The small network element 112 and the network element 102 may be connected over the X2 interface 120 providing communication link between network elements, such as the network elements 102, 112.

The small network element 112 may control a cellular radio communication link 116 established between the small network element 112 and at least one terminal device 110 located within or comprised in the cell 114, as was the case with the communication link 106.

The network element 102 and the small network element may be further connected via an S1 interface to an evolved packet core (EPC), more specifically to a mobility management entity (MME) and to a system architecture evolution gateway (SAE-GW).

The at least one terminal device 110 may be simultaneously within multiple cells provided by network elements. The serving network element may be selected by various criteria, such as received power, signal to noise ratio (SNR) and path loss, to name a few. The at least one terminal device 110 may be a terminal device of a cellular communication system, e.g. a computer (PC), a laptop, a palm computer, a mobile phone, a tablet, a phablet or any other user terminal or user equipment capable of communicating with the cellular communication network.

In an embodiment, the at least one terminal device 110 is able to communicate with other similar devices via the network element 102. The other devices may be within the cell 104 and/or may be within other cells provided by other network elements. The at least one terminal device 110 may be stationary or on the move. In an embodiment, the at least one terminal device 110 may communicate directly with other terminal devices using, for example, Device-to-Device (D2D) communication.

The radio system may support Dual Connectivity (DC). This may be enabled by the network elements 102, 112. Naturally, in order to use DC, the at least one terminal device 110 may also need to support DC. The DC may be a radio system feature, wherein the at least one terminal device 110 may simultaneously receive and may also simultaneously transmit to at least two network points. Thus, the small network element 112 and the network element 102 may be able to transmit and/or receive data simultaneously to the at least one terminal device 110.

In DC, it may be possible to use at least three different bearers: a Master Cell Group (MGG) bearer, a Secondary Cell Group (SCG) bearer and a split bearer. When split bearers are used, the network element 102 acting as a master network element, such as a master eNB (MeNB), may control the downlink terminal device data delivery, with the small network element 112 acting as a secondary network element, such as a secondary eNB (SeNB). For this to function, the small network element 112 may provide information about the downlink terminal device data delivery to the network element 102, for example, via X2 interface. Thus, the network element 102 controlling the split bearer delivery may know how the overall downlink terminal device data delivery is proceeding to the at least one terminal device 110, and act accordingly.

Even though the small network element 112 may provide the network element 102 information about the data delivery, the data delivery may not always be without complications. For example, when the network element 102 has the small network element 112 to transmit a portion of data to the at least one terminal device 110, wherein the other portion of the said data is transmitted by the network element 102, the small network element 112 may not receive all of the portion of the data. As described above, the small network element 112 may inform, using X2 interface 120 for example, the network element 102 that some of the portion of the data was not received. However, if the network element 102 does not receive the said information about the lacking data, the split bearer delivery may not function properly.

FIG. 2 illustrates a flow diagram of an embodiment of the invention. Referring to FIG. 2, in step 210, a first network node, such as the small network element 112, may receive data packets transmitted by a second network node, such as the network element 102. The received data may comprise a portion of data addressed to the at least one terminal device 110. The data addressed to the at least one terminal device 110 may be related to, for example, voice, video, messages, internet and to other similar data used by the at least one terminal device 110. The data addressed to the at least one terminal device 110 may comprise one or more data packets and/or data units. Thus, the data received may comprise a subset of the one or more data packets. Furthermore, the received data may comprise control information comprising, for example, information about the sub-group of the one or more data packets and/or information about the data addressed to the at least one terminal device 110.

In step 220, if at least one data packet of the received data packets is noticed not being available to the first network node, the first network node may send an indication to the second network node that the at least one data packet of the data packets is not available to the first network node. The indication may be done via the X2 interface 120, for example.

In step 230, the first network node may repeat sending the indication until a confirmation message is received, wherein the confirmation message comprises confirmation that the indication is received by the second network node. The confirmation message may be received from the second network node, for example. The repeated indication may mean that the indication is sent with a certain time interval until the confirmation message is received. The time interval may be, for example, 10 milliseconds (ms). FIG. 3 illustrates a flow diagram of an embodiment of the invention. FIG. 3 may illustrate the operations of the second network node in relation to FIG. 2. Referring to FIG. 3, in step 310, the second network node may transmit data packets to the first network node. As described, the transmitted data may be received by the first network node as in step 210 of FIG. 2.

In step 320, the second network node may receive the indication, sent by the first network node in step 220. The received indication may indicate that the at least one data packet of the transmitted data packets is not available to the first network node. Thus, the at least one data packet may not be in possession of the first network node. The indication may be repeated, by the first network node. The repeated indication may mean that the indication is received one or more times by the second network node. The second network node may not be aware that the indication is transmitted repeatedly by the first network node as it may not receive all of the sent indications. However, this may increase the reliability of delivery of the indication to the second network node.

In step 330, the second network node may send, as a response to the receiving of the indication, the confirmation message to the first network node, wherein the confirmation message comprises confirmation that the indication is received by the second network node. The first network node may receive the confirmation message and stop the repeated sending of the indication. The confirmation message may further cause the first network node to stop the sending of the indication. Therefore, the indication may only be received once, but may be sent more than one time, by the first network node as in step 230 of FIG. 2. Furthermore, if the confirmation message is sent, but the indication is still received, the second network node may repeat sending the confirmation message until the receiving of the indication stops. This may be beneficial if the confirmation message is lost when transmitted to the first network node.

In an embodiment, the noticing, by the first network node, that the at least one data packet is not available is based on at least one of a detecting, by the first network node, a pause in the reception of the data packets, observing, by the first network node, a discontinuity in the received data packets and discarding, by the first network node, at least one data packet of the received data packets before carrying out relaying of the at least one data packet. The observing the discontinuity in the received data packets may be based on observing the discontinuity in sequence numbers of the received data packets.

In an embodiment, if a pause in the reception of the data packets is detected, a discontinuity in the received data packets is observed and/or at least one data packet of the received data packets is discarded before carrying out relaying of the at least one data packet, the first network node sends the indication to the second network node. The indication may thus be sent if even one of the detecting, observing or discarding is done by the first network node. Furthermore, it is to be noted that the detecting of the pause may be performed by the first network node, the observing the discontinuity in the received data packets may be performed by the first network node and the discarding the at least one data packet may be performed by the first network node.

In an embodiment, the second network node may transmit a second set of data packets to the at least one terminal device 110, wherein the data packets transmitted to the first network node (block 310) are a first set of data packets, wherein the first and second sets of data packets are data addressed to the at least one terminal device 110. Thus, the data addressed to the at least one terminal device 110 may comprise the first and second sets of data. The second network node may form the first and the second sets of data from the data addressed to the at least one terminal device 110. Therefore, the second network node may determine which part of the data addressed to the at least one terminal device 110 is transmitted by the second network node, and which part is sent to the first network node for the first network node to transmit to the at least one terminal device 110.

In an embodiment, the indication indicates at least one sequence number of the received data packets by the first network node. The indication may indicate a group of sequence numbers.

In an embodiment, the indication indicates the sequence number, in relation to the received data packets, of the at least one data packet that is noticed not being available to the first network node. This may mean that the indication may also indicate sequence numbers of data packets which do not belong to the received data packets and/or are not yet received. Thus, the indication may not be limited to the received data packets. The same indication may be received by the second network node. Thus, the indication may be in relation to the transmitted data packets.

In an embodiment, the indication comprises a range of sequence numbers, and wherein the range of sequence numbers indicates at least one sequence number of the received data packets. The range of sequence numbers may further indicate sequence numbers outside the range of the received data packets. Thus, the range of sequence numbers may indicate sequence numbers of data packets which are received earlier and/or not yet received.

In an embodiment, the range of sequence numbers indicate sequence numbers of data packets which are received earlier than the data packets of step 210 of FIG. 2. In an embodiment, the range of sequence numbers indicate sequence numbers of data packets which are not yet received by the first network node.

In an embodiment, the range of sequence numbers indicates the sequence number, among the received data packets, of each of the at least one data packet that is noticed not being available to the first network node. Thus, the data packets that are not available to the first network node are indicated.

In an embodiment, the first network node determines that at least one data packet of the received data packets is lacking, wherein the determining is based on the observing, by the first network node, the discontinuity in the received data packets and/or the discarding, by the first network node, the at least one data packet of the received data packets before carrying out relaying of the at least one data packet. The lacking may mean that the at least one data packet is not in possession of the first network node and/or the data packet is missing. The determination may be based on the received data and/or the control information received with the data. For example, if the control information specifies the amount of data packets and the first network node receives a different amount of data packets, the first network node may determine that it has not received a certain data packet. In an embodiment, the observing the discontinuity in the received data packets is based on observing the discontinuity in sequence numbers of the received data packets.

In an embodiment, the indication comprises a sequence number of each of the lacking at least one data packet, and wherein the sequence number indicates the sequence number of each of the lacking at least one data packet among the received data packets. As the received data packets may comprise a sequence number indicating the data packet sequence among the received data packets, the first network node may be aware of the specific data packet(s) lacking. The indication may comprise a sequence number range, wherein the sequence number range may indicate one or more data packets lacking by the first network node.

In an embodiment, the indication comprises a sequence number of each of the lacking at least one data packet, and wherein the sequence number indicates the sequence number of the each of the lacking at least one data packet among the transmitted data packets by the second network node. In an embodiment, the received data packets in step 210 of FIG. 2 are obtained via X2 interface from the second network node, wherein the indicated at least one sequence number of the received data packets is an X2 user plane sequence number.

Figure 4:
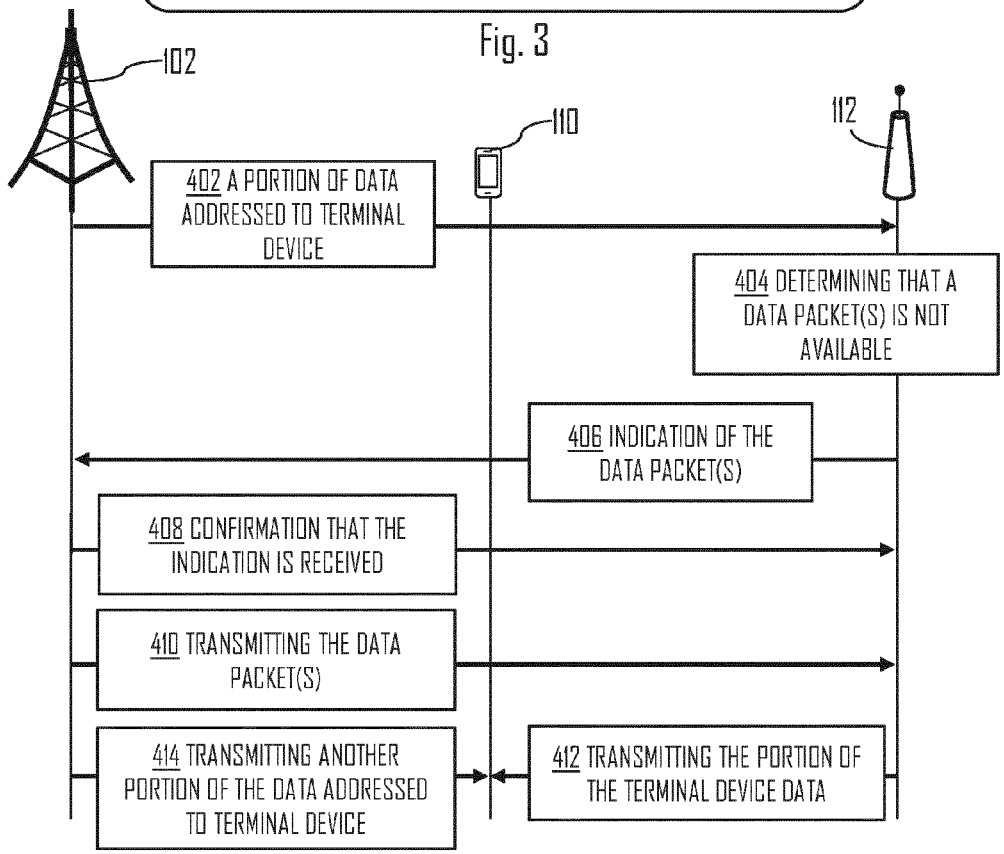
FIG. 4 illustrates an embodiment of the invention.

FIG. 4 illustrates the delivery of the data addressed to the at least one terminal device 110 according to an embodiment of the invention. Referring to FIG. 4, the network element 102, acting as the second network node of FIGS. 2 and 3, may determine that a split bearer may be used to deliver terminal device data to the at least one terminal device 110. The network element 102 may initiate transmission of at least a portion and/or a sub-stream of the data addressed to the terminal device 110 to the small network element 112, acting as the first network node of FIGS. 2 and 3. This is shown with a block 402. The transmitted data may comprise the first set of data packets, described earlier in relation to step 320 of FIG. 3. The small network element 112 may receive the first set of data packets as they are transmitted by the network element 102.

In block 404, the small network element 112 may determine that a certain data packet(s) is not available to the small network element 112. The determination may be based on several reasons. First, network element 102 may not have started the transmission of block 402, and the small network element 112 determines that it has not received anything for a certain time period. Thus, the small network element 112 may determine that it has not received the certain data packet(s). Second, the network element 102 may have started the transmission and, after that, paused the transmission. The small network element 112 may determine that the transmission is paused, and thus it may not have received the certain data packet(s). The pausing time may be, for example, 1 ms and/or 10 ms, and after waiting the pausing time, determination that the transmission is paused may be done, by the small network element 112. The determination of the pausing may further be done by the small network element 112 when it has not received the transmission from the network element 102 for duration of the pausing time. This may happen even though the transmission is performed, by the network element 102, as the transmitted data packet(s) may be lost in transmission.

Third, the small network element 112 may observe a discontinuity in the received first set of data packets. The observing may be based on the sequence numbers of the first set of data packets. For example, if the small network element 112 receives data packets with sequence numbers 1 and 3, the small network element 112 may determine that the data packet with sequence number 2 is lacking.

Fourth, at least one data packet of the received first set of data packets is discarded before carrying out relaying of the at least one data packet. The relaying may be done to the at least one terminal device 110. The discarding may happen if, for example, the small network element 112 determines that its data buffer is full and/or the small network element 112 is incapable of receiving the at least one data packet. Thus, the small network element 112 may not have the discarded data packet(s) in possession and/or available. However, the determination may not be based on data packet(s) which are already relayed to the at least one terminal device 110 and, after that, discarded.

In an embodiment, the small network element 112 determines that one or more data packets are lacking. This may be achieved similarly as described above in relation to the lacking data packet.

In an embodiment, the at least one data packet is transmitted by the network element 102, but is corrupted and/or lost in transmission before received by the small network element 112. Thus, the small network element 112 may determine that it does not have the at least data packet, and thus it may be not available for the small network element 112.

In block 406, the small network element 112 may send an indication of the at least one data packet to the network element 102. The indication may be sent if any of the conditions of block 404 are fulfilled. In an embodiment, the indication is sent to other network element. The other network element may deliver the indication to the network element 102.

In an embodiment, the indication is received as a result of at least one of that a pause in the reception is detected by the small network element 112, that a discontinuity in the transmitted data packets is observed by the small network element 112, and that at least one data packet of the transmitted data packets is discarded by the small network element 112 before carrying out relaying of the at least one data packet. The indication may comprise a range of sequence numbers, wherein the range of sequence numbers may indicate at least one sequence number of the transmitted data packets by the network element 102.

In an embodiment, the network element 102 determines, based at least partly on the received indication, that the first network node is lacking at least one data packet of the transmitted data packets.

In an embodiment, the indication comprises a sequence number indicating the sequence number of the at least one data packet among the received first set of data packets. The at least one data packet may be, for example, determined to be not available and/or lacking by the small network element 112.

The sending of the indication may be repeated, by the small network element 112, as long as confirmation for the reception of the indication is received from the network element 102 and/or the other network element (block 408). In an embodiment, the small network element 112 receives the confirmation message, wherein the confirmation message comprises confirmation that the indication is received, and in a response to the said receiving, stops the repeated sending of the indication. As said, the confirmation message may be sent by the network element 102, for example.

In an embodiment, the transmitted data, by the network element 102, causes the small network element 112 to determine that at least one data packet of the transmitted data is lacking, and wherein the transmitted data further causes the small network element 112 to repeatedly send an indication, to the network element 102, that the data packet is lacking.

In an embodiment, the network element 102 transmits the lacking at least one data packet to the at least one terminal device 110. This may be done after the indication of the lacking at least one data packet is received. The transmitting may be done before and/or after the sending of the confirmation message.

In an embodiment, the small network element 112 determines that one or more data packets are lacking. The small network element 112 may then send as many indications as there are lacking data packets to the network element 102. These indications may be sent in a single message and/or separately. The network element 102 may confirm the reception of each indication in a single confirmation message and/or more than one confirmation message may be sent. Each confirmation message may comprise confirmations to one or more indications of lacking data packets.

Still referring to FIG. 4, in step 410, the network element 102 may transmit the at least one data packet to the small network element 112. For example, the at least one data packet may be determined to be lacking by the small network element 112. The transmitting may be done, for example, after the confirmation message is sent by the network element 102. The small network element 112 may receive the at least one data packet from the network element 102.

In step 412, the small network element 112 may transmit at least a portion of the first set of data packets to the at least one terminal device 110. The said portion of the first set of data packets may be a part of the received data in block 402. In an embodiment, the said portion may be and/or comprise the received data in block 402.

In an embodiment, the small network element 112 receives the at least one data packet, of which the small network element 112 has sent the indication(s) in block 406, from the network element 102, and transmits the at least one data packet to the at least one terminal device 110.

In an embodiment, the small network element 112 receives the at least one data packet, of which the small network element 112 has sent the indication(s) in block 406, from the network element 102, and transmits the received at least one data packet together with the portion of first set of data packets received in block 402. Thus, the data transmission to the at least one terminal device 110 in block 412 may comprise the initially received data, from the network element 102, and the data that was initially determined to be not in possession of the small network element 112, and received, from the network element 102, after the indication of the at least one data packet in block 406.

In step 414, the network element 102 may transmit another portion of the data addressed to the at least one terminal device 110 to the at least one terminal device 110. The said portion may be a second set of data packets. The transmitting may be done simultaneously with the data transmission of block 412. Naturally, the simultaneous used in this occasion may mean that the at least one terminal device 110 may receive the data addressed to the at least one terminal device 110 from two different sources somewhat at the same time, but the timing of the different data packets may vary. This is explained later in relation to FIG. 5A.

In an embodiment, the indication, transmitted to the network element 102 by the small network element 112, causes the second network element 102 to transmit the at least one data packet indicated by the indication to the at least one terminal device 110. Thus, the at least one data packet may not need to be transmitted to the small network element 112. This may be beneficial in some cases and save resources of the radio system and/or time. In an embodiment, the network element 102 transmits the at least one data packet to the at least one terminal device 110. The transmission may be based on the determination, by the network element 102, that radio resources and/or time may be saved.

In an embodiment, the transmitted data, by the network element 102 to the small network element 112, comprises a first sub-stream of data addressed to the at least one terminal device 110, and wherein a second sub-stream of the data addressed to the at least one terminal device 110 is transmitted, by the network element 102, to the at least one terminal device 110. The first sub-stream may comprise and/or be the first set of data packets and/or the second sub-stream may comprise and/or be the second set of data packets. In an embodiment, the first sub-stream of data is transmitted to the small network element 112 so that the first sub-stream and the second sub-stream are transmitted to the at least one terminal device 110 within a same reception window of the at least one terminal device 110. The reception window may be the active part of packet sequence-number space which is used by the at least one terminal device 110 to receive predetermined amount of data packets. For example, the reception window may correspond to a certain amount of Packet Data Convergence Protocol (PDCP) Protocol Data Units (PDU).

In an embodiment, the lacking data packet is received, but it is determined to be corrupted by the small network element 112. Thus, it may be unusable for transmission to the at least one terminal device 110, and thus an indication of the corrupted data packet may be sent to the network element 102 similarly as the indication of the lacking data packet.

Figure 5A:
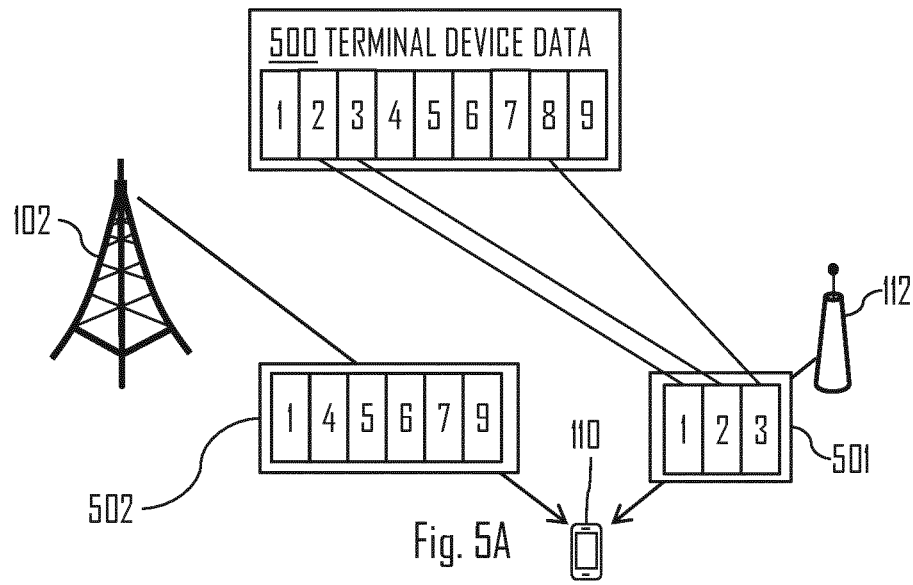
FIGS. 5A, 5B and 5C illustrate some embodiments of the invention.

FIG. 5A illustrates an embodiment of the invention. Referring to FIG. 5A, the terminal device data 500, such as the data addressed to the at least one terminal device 110, may comprise data packets numbered from 1 to 9. The terminal device data 500 may further comprise control information not shown in FIG. 5A. The terminal device data 500 may be controlled by the network element 102. In an embodiment, the controlling is done by a scheduler comprised in the network element 102. In an embodiment, the scheduler may be comprised in and/or be another network element, wherein the other network element is connected to the network element 102, and wherein the connection enables data transfer between the network elements. The terminal device data 500 may comprise PDCP PDUs. The PDCP PDUs may comprise a sequence number defining the sequence of each of the PDUs in relation to other PDUs. The numbering from 1 to 9 may be the sequence numbering of the PDUs.

The network element 102 may allocate different data packets of the terminal device data 500 to be sent by different network nodes supporting the DC split bearer function. In the example of FIG. 5A, the network element 102 may allocate data packets with PDCP sequence numbers 2, 3 and 8 to be transmitted to the at least one terminal device 110 by the small network element 112. This may mean that the said data packets, comprised in a first portion 501, are transmitted to the small network element 112, as described earlier. In an embodiment, the network element 102 transmits control information to the small network element 112, wherein the control information causes the small network element 112 to transmit the data packets of the first portion 501 to the at least one terminal device 110. The network element 102 may transmit the second portion 502 of the terminal device data 500 to the at least one terminal device 110.

The transmission of the first portion 501 to the small network element 112 may be done, for example, via the X2 interface 120. The sequence numbering of the data packets comprised in the first portion 501 may be based on the X2 user plane (X2-U) sequence numbering. Thus, the data packets of the first portion 501 may be numbered from 1 to 3, wherein the X2-U sequence number 1 may correspond to the PDCP sequence number 2, the X2-U sequence number 2 may correspond to the PDCP sequence number 3 and the X2-U sequence number 3 may correspond to the PDCP sequence number 8. However, as the transmission of the PDCP PDUs may not have to be transmitted in the initial sequence, the PDCP PDUs may be in different order when transmitted via X2 interface 120. The small network element 112 may be aware of the X2-U sequence numbering, but may not know the initial PDCP PDU sequence numbering. In an embodiment, the small network element 112 is aware of the both sequence numberings. In both embodiments, the small network element 112 may only know the sequence numbering(s) of the PDU(s) if it has already received the PDU(s). Thus, the small network element 112 may not be aware of sequence numbering(s) of a data packet, if the data packet is not yet received.

Figure 5B:
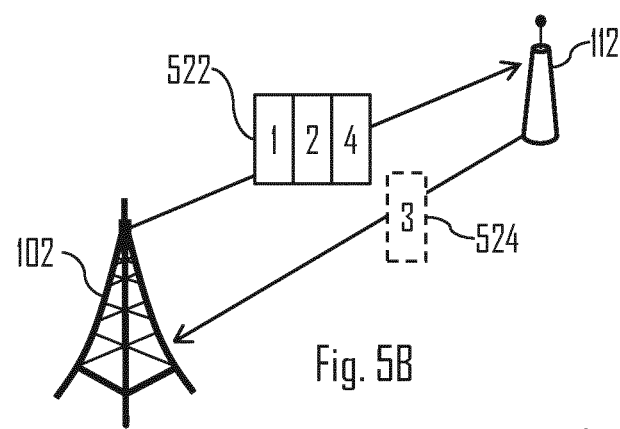

FIG. 5B illustrates an embodiment of the invention. Referring to FIG. 5B, the small network element 112 may receive data 522 from the network element 102. In an embodiment, the received data 522 is obtained via X2 interface 120. The received data 522 may comprise data packets, wherein each of the data packets comprises the X2-U sequence number. The sequence number may be individual for each data packet. Based on the X2-U sequence numbering of the data packets 522, the small network element 112 may determine that a data packet with X2-U sequence number 3 may be lacking as there is a discontinuity in the sequence numbering. This may be determined as the X2-U sequence numbers with 2 and 4 may be received. As the sequence numbering may be linear, the determination may be possible.

In an embodiment, the network element 102 transmits information about the amount of data packets to the small network element 112. The small network element 112 may receive the said information about the number of data packets, and based at least partly on the received information, determine if the last data packet is lacking from the received data packets.

Still referring to FIG. 5B, the small network element 112 may send an indication 524 about the lacking data packet to the network element 102. This may be done after the data packet was determined to be lacking. The indication 524 may comprise the X2-U sequence number of the lacking data packet, wherein the X2-U sequence number may be 3 for the lacking data packet. The indication 524 may be received by the network element 102, and the network element 102 may determine, based on the X2-U sequence number that the lacking data packet is the third sent data packet of the data packets 522.

In an embodiment, the indication 524 is received, from the small network element 112, during a pause in the transmission of the data packets 522. The network element 102 may stop the transmission for a certain time period. The small network element 112 may detect the pause in the transmission and send the indication 524 to the network element 102, wherein the indication may indicate that the small network element 112 has not received a certain data packet. The indication may comprise, for example, the highest sequence number among the sequence numbers of the received data packets the small network element 112 has received. The highest sequence number may, for example, be the sequence number of the data packet that was received last by the small network element 112.

Figure 5C:
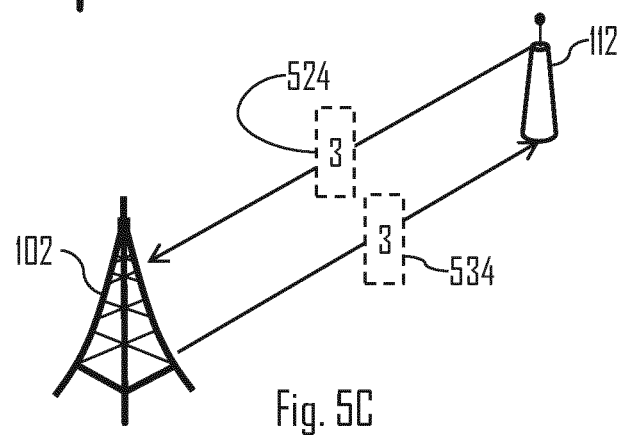

Let us look closer on the confirmation message that may be sent by the network element 102 to the indication 524 in relation to FIG. 5C. Referring to FIG. 5C, the repeated indication 524 may be received by the network element 102. The network element 102 may send a confirmation message 534 comprising confirmation that the indication 524 was received. The confirmation message 534 may be received, by the small network element 112, and the repeated sending may be stopped by the small network element 112. The confirmation message 534 may comprise the X2-U sequence number of the lacking data packet. Thus, the small network element 112 may determine that the repeated indication comprising the same X2-U sequence number may be stopped.

In an embodiment, the repeated indication 524 comprises a value range of sequence numbering of a plurality of indicated data packets. For example, the indication 524 may indicate that data packets with sequence number from 2 to 5 are lacking.

There may be a plurality of indications, similar to indication 524, sent by the small network element 112, and each of them may be handled separately by the network element 102. Therefore, each indication may be confirmed by the corresponding X2-U sequence number.

In an embodiment, after receiving the indication 524, the network element 102 transmits the lacking data packet to the at least one terminal device 110.

In an embodiment, after receiving the indication 524, the network element 102 transmits the lacking data packet to the small network element 112 with a new X2-U sequence number. The transmission may comprise control information, wherein the control information defines the identity of the transmitted data packets so that they may not be mix up with the initially received data packets 522. The control information may, for example, comprise a Globally Unique Identifier (GUID). The small network element 112 may receive the lacking data packet before and/or after the receiving of the confirmation message 534. In an embodiment, the confirmation message 534 comprises the lacking data packet and/or data packets.

In an embodiment, the confirmation message 534 comprises an information element, wherein the information element comprises the value of the X2-U sequence number, and wherein the X2-U sequence number corresponds to an indicated lacking data packet. The data packet may be PDU, for example.

In an embodiment, the confirmation message comprises Acknowledge (ACK) to an indication of lacking data packet.

In an embodiment, the indication 524 comprises a sequence number, and wherein the sequence number indicates the sequence number of the data packet among the received data 522. In an embodiment, the sequence number is an X2-U sequence number.

In an embodiment, the small network element 112 comprises a secondary base station of a radio system supporting DC, and wherein the network element 102 comprises a master base station of the said radio system. The secondary base station may be a SeNB and the master base station may be a MeNB.

In an embodiment, the repeated indication, such as the repeated indication 524 of FIG. 5B and/or the repeated indication in step 230 of FIG. 2, is comprised in DL DATA DELIVERY STATUS frame sent by the SeNB to the MeNB. THE DL DATA DELIVERY STATUS frame may further comprise at least one of the following: highest successfully delivered PDCP sequence number, available buffer size for the E-UTRAN Radio Access Bearer (E-RAB) and available buffer size for the at least one terminal device 110. The DL DATA DELIVERY STATUS frame may be sent repeatedly, by the small network element 112, to the network element 102. Thus, the repeated sending of the DL DATA DELIVERY STATUS frame may continue even though confirmation to the indication is received. However, the particular indication may not be comprised in the DL DATA DELIVERY STATUS frame after the confirmation. There may be multiple indications transmitted substantially simultaneously, wherein the indications may all be comprised in the DL DATA DELIVERY STATUS frame.

Figure 6:
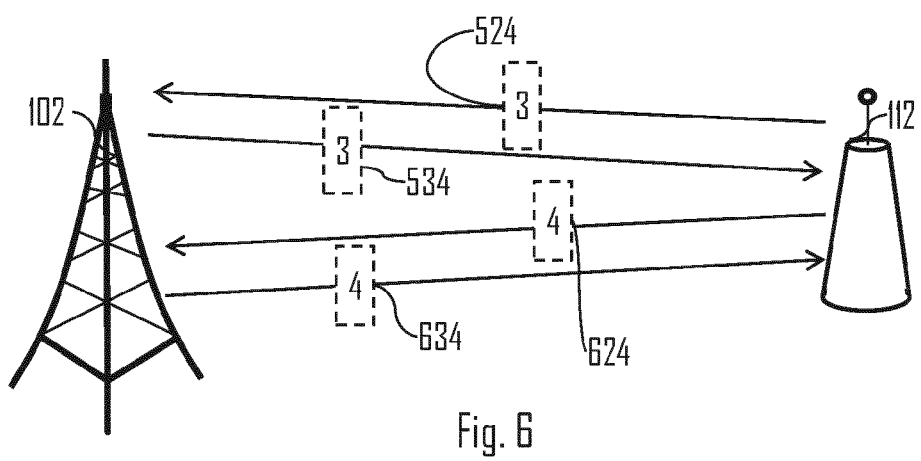
FIG. 6 illustrates indication of a second data packet according to an embodiment of the invention.

FIG. 6 illustrates indication of a second data packet not available to the small network element 112 according to an embodiment of the invention. Referring to FIG. 6, the small network element 112 may determine that a second data packet of the received data is not available to the small network element 112. The received data may be the received data in step 210 of FIG. 2, for example. The small network element 112 may send a second indication 624, to the network element 102, that the second data packet is not available. The small network element 112 may repeat sending the second indication until the confirmation message 634 is received, from the network element 102, wherein the confirmation message 634 comprises confirmation that the second indication 624 is received by the network element 102. The network element 102 may receive the repeated indication 624 and send the confirmation message 634 comprising confirmation that the indication 624 is received.

In an embodiment, the small network element 112 sends an indication 524 that a data packet, such as a PDU, with X2-U sequence number 3 is not available to the small network element 112. The small network element 112 may further detect that also a data packet with X2-U sequence number 4 is not available. The small network element 112 may send both indications 524, 624 to the network element 102, wherein the indication 624 may indicate that the data packet with X2-U sequence number 4 is not available. The network element 102 may receive the indication 524, and reply with a confirmation message 534 that the indication 524 was received. The small network element 112 may receive the confirmation message 534. The small network element 112 may then repeat sending only the indication 624, as the confirmation message 534 for indication 524 was received.

In an embodiment, the indications 524, 624 are comprised in an information element. The information element may be sent to the network element 102 by the small network element 112. Thus, both indications 524, 624 may be transmitted in the same information element.

Figure 7:
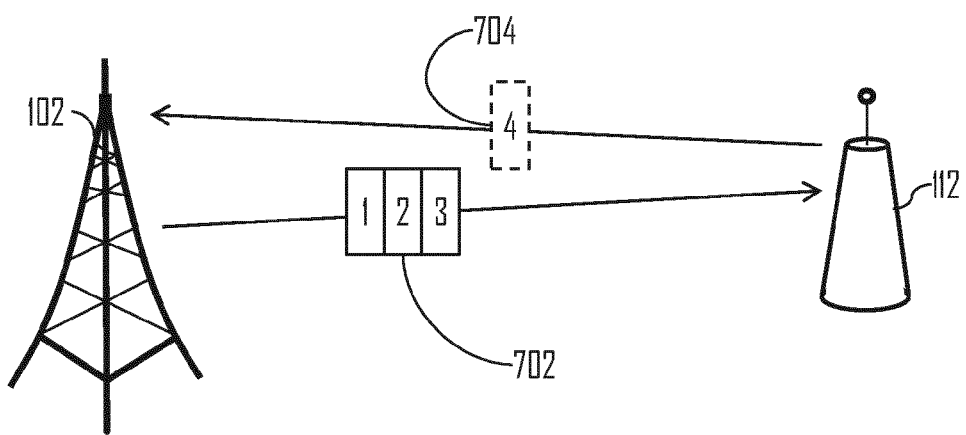
FIG. 7 illustrates an embodiment of the invention.

FIG. 7 illustrates an embodiment of the invention. Referring to FIG. 7, the network element 102 may transmit data packets 702 with sequence numbers from 1 to 3 to the small network element 112. The small network element 112 may receive the data packets 702. The small network element 112 may then determine that at least one data packet is not available for the small network element 112. The determination may be based on detecting a pause in the transmission of the data packets 702, for example.

The small network element 112 may send a repeated indication 704 to the network element 102, wherein the repeated indication 704 indicates that the data packet with sequence number 4 is not available for the small network element 112. The repeated indication 704 may also indicate a group of data packets. The data packet, that is noticed to not be available, may not have been received at all by the small network element 112 before sending the repeated indication 704. Sending the sequence number 4 may mean that the repeated indication 704 may be in relation to the received and/or transmitted data packets 702.

In an embodiment, the network element 102 may transmit the data packet with sequence number 4 to the at least one terminal device 110 after receiving the indication 704. Thus, the small network element 112 may indicate which data packet(s) are not available for it, and indicate the network element 102 of the not available data packets, and thus the network element 102 may transmit the not available data packets to the at least one terminal device 110.

Figure 8:
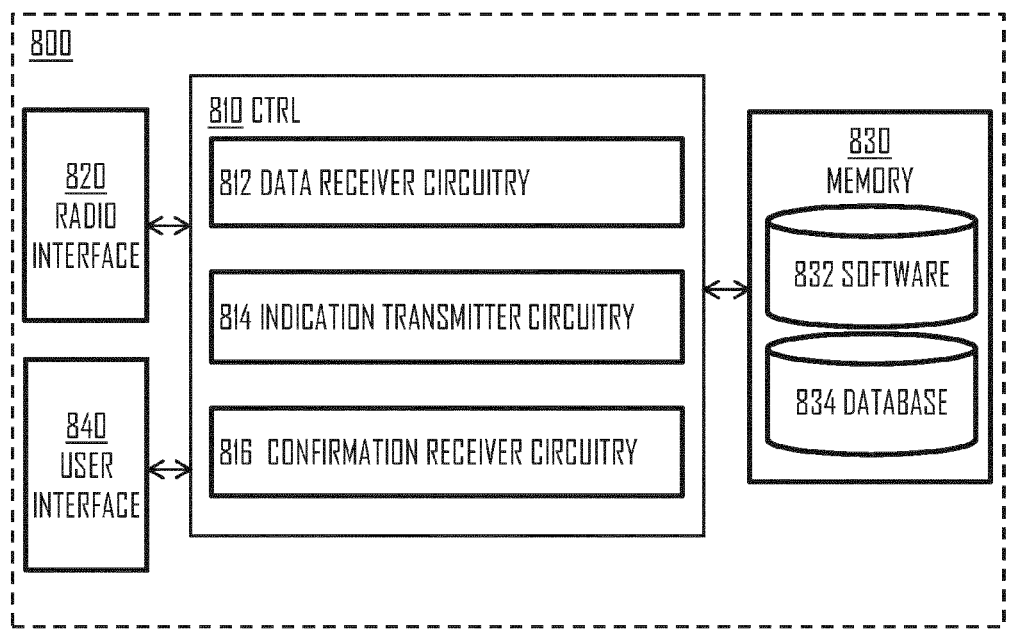
FIGS. 8 and 9 illustrate apparatuses according to some embodiments of the invention.
Figure 9:
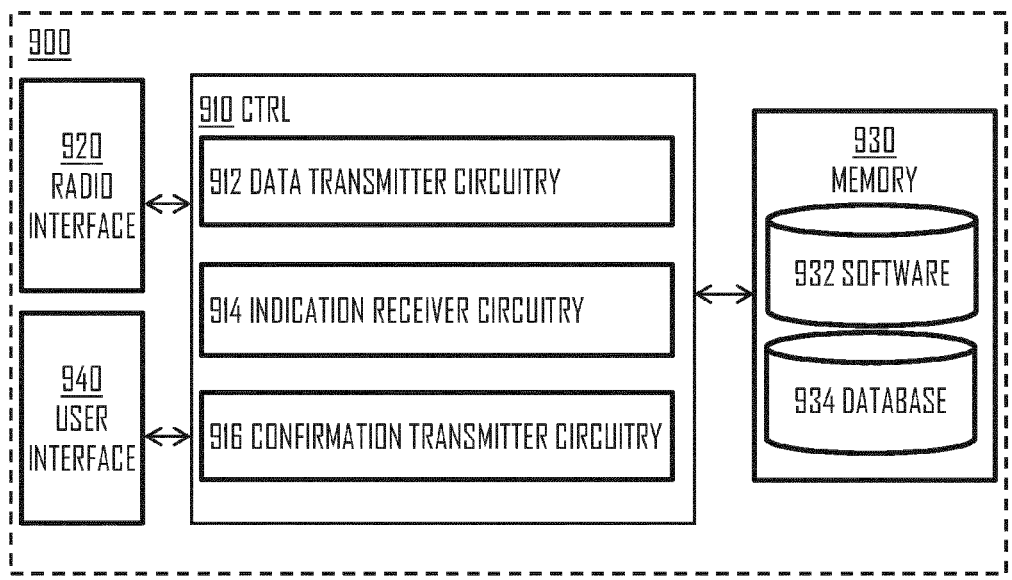

FIGS. 8 to 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1 to 7, or operations thereof.

In an embodiment, these operations may comprise tasks, such as, receiving, by a first network node, data packets transmitted by a second network node, if at least one data packet of the data packets is noticed not being available to the first network node, sending an indication to the second network node that the at least one data packet of the data packets is not available to the first network node, and repeating sending the indication until a confirmation message is received, wherein the confirmation message comprises confirmation that the indication is received by the second network node.

In an embodiment, these operations may comprise tasks, such as transmitting, by a second network node, data packets to a first network node, receiving an indication from the first network node that at least one data packet of the data packets is not available to the first network node, and sending a confirmation message to the first network node, wherein the confirmation message comprises confirmation that the indication is received by the second network node.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data, such as the received data packets.

The apparatus 800 may further comprise radio interface (TRX) 820 comprising hardware and/or software for realizing communication connectivity according to one or more communication protocols. The TRX may provide the apparatus with communication capabilities to access the radio access network and enable communication between network nodes, for example. The TRX may provide the apparatus 800 connection to the above-mentioned X2 interface. The TRX may comprise standard well-known components such as an amplifier, filter, frequency-converter, (de)modulator, and encoder/decoder circuitries and one or more antennas.

The apparatus 800 may also comprise user interface 840 comprising, for example, at least one keypad, a microphone, a touch display, a display, a speaker, etc. The user interface 840 may be used to control the respective apparatus by a user of the apparatus 800.

In an embodiment, the apparatus 800 may be or be comprised in a base station (also called a base transceiver station, a Node B, a radio network controller, or an evolved Node B, for example). The apparatus 800 may be the secondary eNB of the DC operation. In an embodiment, the apparatus 800 is or is comprised in the small network element 112. In an embodiment, the apparatus 800 is the first network node of FIGS. 2 and 3.

The control circuitry 810 may comprise a data receiver circuitry 812, wherein the data receiver circuitry 812 may be configured to receive data packets transmitted by a second network node. The control circuitry 810 may notice if at least one data packet of the data packets is not available. The control circuitry 810 may comprise an indication transmitter circuitry 814 configured to send an indication to the second network node that the at least one data packet of the data packets is not available if the control circuitry 810 notices that the at least one data packet is not available. The indication transmitter circuitry 814 may repeat sending the indication until a confirmation message is received, wherein the confirmation message comprises confirmation that the indication is received by the second network node. The confirmation message may be received by a confirmation receiver circuitry 816, which may be comprised in the control circuitry 810.

Referring to FIG. 9, the memory 930 may be implemented using any suitable data storage technology, such as semiconductor based memory devices, flash memory, magnetic memory devices and systems, optical memory devices and systems, fixed memory and removable memory. The memory 930 may comprise a database 934 for storing data, such as the data packets to be transmitted to the first network node.

The apparatus 900 may further comprise radio interface (TRX) 920 comprising hardware and/or software for realizing communication connectivity according to one or more communication protocols. The TRX may provide the apparatus with communication capabilities to access the radio access network and enable communication between network nodes, for example. The TRX may provide the apparatus 900 connection to the above-mentioned X2 interface. The TRX may comprise standard well-known components such as an amplifier, filter, frequency-converter, (de)modulator, and encoder/decoder circuitries and one or more antennas.

The apparatus 900 may also comprise user interface 940 comprising, for example, at least one keypad, a microphone, a touch display, a display, a speaker, etc. The user interface 940 may be used to control the respective apparatus by a user of the apparatus 900.

In an embodiment, the apparatus 900 may be or be comprised in a base station (also called a base transceiver station, a Node B, a radio network controller, or an evolved Node B, for example). The apparatus 900 may be the master eNB of the DC operation. In an embodiment, the apparatus 900 is or is comprised in the network element 102. In an embodiment, the apparatus 900 is the second network node of FIGS. 2 and 3.

The control circuitry 910 may comprise a data transmitter circuitry 912 configured to transmit data packets to a first network node. The control circuitry 910 may further comprise an indication receiver circuitry 914 configured to receive an indication from the first network node that at least one data packet of the data packets is not available to the first network node. The control circuitry 910 may also comprise a confirmation transmitter circuitry 916 configured to send a confirmation message to the first network node, wherein the confirmation message comprises confirmation that the indication is received by the indication receiver circuitry 914.

Figure 10:
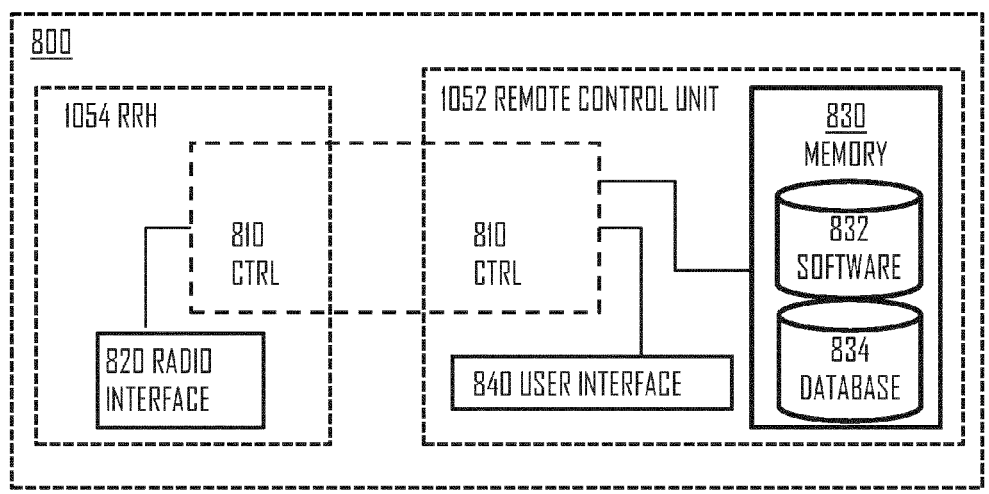
FIG. 10 illustrates an embodiment of the invention.

In an embodiment, as shown in FIG. 10, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 of FIG. 10, utilizing such shared architecture, may comprise a remote control unit (RCU) 1052, such as a host computer or a server computer, operatively coupled (e.g. via a wireless or wired network) to a remote radio head (RRH) 1054 located in the base station. In an embodiment, at least some of the described processes may be performed by the RCU 1052. In an embodiment, the execution of at least some of the described processes may be shared among the RRH 954 and the RCU 1052. Although FIG. 10 illustrates only the shared functionalities of the apparatus 800, similar shared architecture may be used also with the apparatus 900 of FIG. 9.

In an embodiment, the RCU 1052 may generate a virtual network through which the RCU 1052 communicates with the RRH 1054. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7 or operations thereof. In an embodiment, these operations may comprise tasks, such as, receiving, by a first network node, data packets transmitted by a second network node, if at least one data packet of the data packets is noticed not being available to the first network node, sending an indication to the second network node that the at least one data packet of the data packets is not available to the first network node, and repeating sending the indication until a confirmation message is received, wherein the confirmation message comprises confirmation that the indication is received by the second network node. In an embodiment, these operations may comprise tasks, such as transmitting, by a second network node, data packets to a first network node, receiving an indication from the first network node that at least one data packet of the data packets is not available to the first network node, and sending a confirmation message to the first network node, wherein the confirmation message comprises confirmation that the indication is received by the second network node.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7, or operations thereof. In an embodiment, these operations may comprise tasks, such as, receiving, by a first network node, data packets transmitted by a second network node, if at least one data packet of the data packets is noticed not being available to the first network node, sending an indication to the second network node that the at least one data packet of the data packets is not available to the first network node, and repeating sending the indication until a confirmation message is received, wherein the confirmation message comprises confirmation that the indication is received by the second network node. In an embodiment, these operations may comprise tasks, such as transmitting, by a second network node, data packets to a first network node, receiving an indication from the first network node that at least one data packet of the data packets is not available to the first network node, and sending a confirmation message to the first network node, wherein the confirmation message comprises confirmation that the indication is received by the second network node.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   receiving, by a first network node, data packets transmitted by a second network node, wherein the data packets comprise a portion of data addressed to at least one terminal device in a split-bearer delivery,
   in response to at least one data packet of the data packets is noticed not being available to the first network node, sending an indication to the second network node that the at least one data packet of the data packets is not available to the first network node; and
   repeating sending the indication until a confirmation message is received, wherein the confirmation message comprises confirmation that the indication is received by the second network node.

2. The method of claim 1, wherein the noticing that the at least one data packet is not available is based on at least one of a detecting, by the first network node, a pause in the reception, observing, by the first network node, a discontinuity in the received data packets and discarding, by the first network node, the at least one data packet of the received data packets before carrying out relaying of the at least one data packet.

3. The method of claim 1, wherein the indication indicates at least one of the following: a sequence number of the received data packets and a sequence number, in relation to the received data packets, of the at least one data packet that is noticed not being available to the first network node.

4. The method of claim 1, wherein the indication is a first indication indicating that a first data packet of the received data is not available to the first network node, the method further comprising:
   determining that a second data packet of the received data is not available to the first network node;
   sending a second indication, to the second network node, that the second data packet is not available;
   receiving a first confirmation message, wherein the first confirmation message comprises confirmation that the first indication is received; and
   in response to the said reception, stopping the repeated sending of the first indication; and
   repeating sending the second indication until a second confirmation message is received, wherein the second confirmation message comprises confirmation that the second indication is received by the second network node.

5. The method of claim 1, wherein the indication is a first indication indicating that a first data packet of the received data is not available to the first network node, the method further comprising:
   determining that a second data packet of the received data is not available to the first network node;
   sending a second indication, to the second network node, that the second data packet is not available;
   receiving a first confirmation message, wherein the first confirmation message comprises confirmation that the first indication is received; and
   in response to the said reception, stopping the repeated sending of the first indication;
   repeating sending the second indication until a second confirmation message is received, wherein the second confirmation message comprises confirmation that the second indication is received by the second network node;
   after receiving the first confirmation message, receiving the first data packet from the second network node, and transmitting the first data packet to at least one terminal device.

6. A method comprising:
   transmitting, by a second network node, data packets to a first network node, wherein the data packets comprise a portion of data addressed to at least one terminal device in a split-bearer delivery,
   receiving an indication from the first network node that at least one data packet of the data packets is not available to the first network node; and sending a confirmation message to the first network node, wherein the confirmation message comprises confirmation that the indication is received by the second network node.

7. The method of claim 6, wherein the indication is received as a result of at least one of that a pause in the reception is detected by the first network node, that a discontinuity in the transmitted data packets is observed by the first network node, and that the at least one data packet of the transmitted data packets is discarded by the first network node before carrying out relaying of the at least one data packet.

8. The method of claim 6, wherein the indication indicates at least one of the following:
a sequence number of the transmitted data packets, and
a sequence number, in relation to the transmitted data packets, of the at least one data packet not available to the first network node.

9. The method of claim 6, further comprising:
determining, based at least partly on the received indication, that the first network node is lacking at least one data packet of the transmitted data packets.

10. The method of claim 6, further comprising:
determining, based at least partly on the received indication, that the first network node is lacking at least one data packet of the transmitted data packets, and
after receiving the indication, transmitting the lacking at least one data packet to the first network node.

11. An apparatus comprising:
at least one processor and at least one memory including a computer program code, wherein the at least one memory and the computer program code are configured, with the at least one processor, to cause a first network node to:
receive data packets transmitted by a second network node, wherein the data packets comprise a portion of data addressed to at least one terminal device in a split-bearer delivery,
in response to at least one data packet of the data packets is noticed not being available to the first network node, send an indication to the second network node that the at least one data packet of the data packets is not available to the first network node; and
repeat sending the indication until a confirmation message is received, wherein the confirmation message comprises confirmation that the indication is received by the second network node.

12. The apparatus of claim 11, wherein the noticing that the at least one data packet is not available is based on at least one of a detection, by the first network node, of a pause in the reception, observation, by the first network node, of a discontinuity in the received data packets and a discard, by the first network node, of the at least one data packet of the received data packets before a relay of the at least one data packet.

13. The apparatus of claim 11, wherein the indication indicates at least one of the following:
a sequence number of the received data packets, and
a sequence number, in relation to the received data packets, of the at least one data packet that is noticed not being available to the first network node.

14. The apparatus of claim 11, wherein the indication is a first indication indicating that a first data packet of the received data is not available to the first network node, and wherein the at least one memory and the computer program code are configured, with the at least one processor, to cause the first network node further to:
determine that a second data packet of the received data is not available to the first network node;
send a second indication, to the second network node, that the second data packet is not available;
receive a first confirmation message, wherein the first confirmation message comprises confirmation that the first indication is received; and
in response to the said reception, stop the repeated sending of the first indication, and
repeat sending the second indication until a second confirmation message is received, wherein the second confirmation message comprises confirmation that the second indication is received by the second network node.

15. The apparatus of claim 11, wherein the indication is a first indication indicating that a first data packet of the received data is not available to the first network node, and wherein the at least one memory and the computer program code are configured, with the at least one processor, to cause the first network node further to:
determine that a second data packet of the received data is not available to the first network node;
send a second indication, to the second network node, that the second data packet is not available;
receive a first confirmation message, wherein the first confirmation message comprises confirmation that the first indication is received; and
in response to the said reception, stopping the repeated sending of the first indication;
repeat sending the second indication until a second confirmation message is received, wherein the second confirmation message comprises confirmation that the second indication is received by the second network node;
after receiving the first confirmation message, receive the first data packet from the second network node, and
transmit the first data packet to at least one terminal device.

16. An apparatus comprising:
at least one processor and at least one memory including a computer program code, wherein the at least one memory and the computer program code are configured, with the at least one processor, to cause a second network node to:
transmitting data packets to a first network node, wherein the data packets comprise a portion of data addressed to at least one terminal device in a split-bearer delivery;
receiving an indication from the first network node that at least one data packet of the data packets is not available to the first network node; and
sending a confirmation message to the first network node, wherein the confirmation message comprises confirmation that the indication is received by the second network node.

17. The apparatus of claim 16, wherein the indication is received as a result of at least one of that a pause in the reception is detected by the first network node, that a discontinuity in the transmitted data packets is observed by the first network node, and that the at least one data packet of the transmitted data packets is discarded by the first network node before carrying out relaying of the at least one data packet.

18. The apparatus of claim 16, wherein the indication indicates at least one of the following:
a sequence number of the transmitted data packets,
a sequence number, in relation to the transmitted data packets, of the at least one data packet not available to the first network node.

19. The apparatus of claim 16, wherein the at least one memory and the computer program code are configured, with the at least one processor, to cause the second network node further to:

determine, based at least partly on the received indication, that the first network node is lacking at least one data packet of the transmitted data packets.

20. The apparatus of claim 16, wherein the at least one memory and the computer program code are configured, with the at least one processor, to cause the second network node further to:
   determine, based at least partly on the received indication, that the first network node is lacking at least one data packet of the transmitted data packets, and
   after receiving the indication, transmitting the lacking at least one data packet to the first network node.

* * * * *